United States Patent
Ogawa

(10) Patent No.: US 11,952,104 B2
(45) Date of Patent: Apr. 9, 2024

(54) SPOILER CONTROL DEVICE, SPOILER CONTROL METHOD, AND STORAGE MEDIUM STORING THEREON PROGRAM FOR CONTROLLING SPOILER

(71) Applicant: NABTESCO CORPORATION, Tokyo (JP)

(72) Inventor: Takashi Ogawa, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 504 days.

(21) Appl. No.: 17/194,704

(22) Filed: Mar. 8, 2021

(65) Prior Publication Data
US 2021/0284325 A1 Sep. 16, 2021

(30) Foreign Application Priority Data
Mar. 10, 2020 (JP) ................. 2020-041082

(51) Int. Cl.
*B64C 13/16* (2006.01)
*B64C 9/00* (2006.01)
*B64C 13/24* (2006.01)

(52) U.S. Cl.
CPC ............... *B64C 13/16* (2013.01); *B64C 9/00* (2013.01); *B64C 13/24* (2013.01)

(58) Field of Classification Search
CPC ............ B64C 13/16; B64C 9/00; B64C 13/24
See application file for complete search history.

(56) References Cited

U.S. PATENT DOCUMENTS

| | | | | |
|---|---|---|---|---|
| 4,087,065 A | * | 5/1978 | Arnquist | B64C 13/0425 244/221 |
| 4,363,098 A | | 12/1982 | Buus et al. | |
| 4,489,907 A | * | 12/1984 | Ziegelmeyer | B64C 13/36 244/99.6 |
| 10,017,273 B2 | * | 7/2018 | Jones | G01M 5/0016 |
| 10,301,038 B2 | * | 5/2019 | Teubner | B64D 45/0005 |
| 2016/0318601 A1 | * | 11/2016 | Arnold | B64C 13/0425 |
| 2019/0152582 A1 | * | 5/2019 | Arnold | B64C 13/0421 |
| 2019/0176966 A1 | * | 6/2019 | Eddy | B64C 13/16 |

FOREIGN PATENT DOCUMENTS

JP H03-62596 B2 9/1991

* cited by examiner

*Primary Examiner* — Gertrude Arthur Jeanglaude
(74) *Attorney, Agent, or Firm* — Pillsbury Winthrop Shaw Pittman, LLP

(57) ABSTRACT

If irregular movement is detected in a given one of left and right spoilers, a spoiler control device outputs a retracting signal for the given one of the spoilers and refrains from outputting the retracting signal for the other of the left and right spoilers, and if the difference between the angles of the left and right spoilers becomes equal to or less than a specified value, the spoiler control device outputs the retracting signal for the other of the left and right spoilers.

8 Claims, 4 Drawing Sheets

SPOILER CONTROL DEVICE, SPOILER CONTROL METHOD, AND STORAGE MEDIUM STORING THEREON PROGRAM FOR CONTROLLING SPOILER

CROSS-REFERENCE TO RELATED APPLICATIONS

This application is based on and claims the benefit of priority from Japanese Patent Application Serial No. 2020-041082 (filed on Mar. 10, 2020), the contents of which are hereby incorporated by reference in its entirety.

TECHNICAL FIELD

The present invention relates to a spoiler control device, a spoiler control method, and a storage medium storing thereon a program for controlling a spoiler.

BACKGROUND

Japanese Examined Patent Publication No. 3-062596 ("the '596 Publication") discloses an aircraft having a main wing with a moving surface, specifically a spoiler, being attached thereto. A plurality of pairs of spoilers are provided, and each pair includes left and right spoilers attached to left and right main wings. Each spoiler is driven by an actuator associated with it. The actuator is configured to move the associated spoiler between a basic position on the same plane as the main wing and a deployed position on a plane tilted upward relative to the main wing. The actuator is controlled by a control signal particularly designed for the actuator and corresponding to, for example, manipulation of the yoke made by a pilot.

When the technology disclosed in the '596 Publication is employed, an inappropriate control signal may be output to the actuator due to, for example, faults in the circuit outputting the control signal. In this case, one of the left and right spoilers forming a pair continuously remains at the deployed position. If such is the case, both of the left and right spoilers forming the pair need to be stopped from being used and moved back to the basic position. While the left and right spoilers forming the pair are retracted to the basic position, the left and right spoilers forming the pair may experience a difference between their angles. This is not desirable since it applies roll moments to the aircraft.

SUMMARY

The present invention addresses such a drawback, and one of the objects is to reduce the roll moment acting on the aircraft while the spoilers are retracted to the basic position.

To solve the above-described problems, a spoiler control device is applicable to an aircraft including left and right spoilers provided on left and right main wings, where when driven by an actuator, each spoiler is movable between a basic position positioned on a same plane as a corresponding one of the main wings and a deployed position on a plane tilted relative to the corresponding main wing. The spoiler control device includes an irregularity detecting unit for detecting whether the left and right spoilers irregularly move toward the deployed position, an angle difference determining unit for obtaining angles formed by the left and right spoilers relative to the main wings and determining whether a difference between the obtained angles of the left and right spoilers is equal to or less than a specified value, and a signal outputting unit for outputting a retracting signal designed to move the left and right spoilers back to the basic position. If the irregular movement is detected in a given one of the left and right spoilers, the signal outputting unit outputs the retracting signal for the given one of the spoilers and refrains from outputting the retracting signal for the other of the left and right spoilers, and if the difference between the angles of the left and right spoilers becomes equal to or less than the specified value, the signal outputting unit outputs the retracting signal for the other of the left and right spoilers.

It is assumed that the retraction of the left and right spoilers starts at the same time with a considerably large difference being provided between their angles. In this case, the difference between the angles is maintained while the left and right spoilers are being retracted and remains even after one of the left and right spoilers is retracted back to the basic position until the other is retracted back to the basic position. This means that roll moments keep acting on the aircraft until both of the spoilers are completely retracted.

The above-listed features of the spoiler control device are designed to address this issue. After the start of the retraction of one of the left and right spoilers that irregularly moves, the retraction of the other spoiler starts only after the difference in angle between the left and right spoilers has significantly decreased. In this way, after the start of the retraction of the other spoiler, the difference in angle between the left and right spoilers is considerably small and the roll moments thus hardly acts on the aircraft. As a result, the present invention can reduce the roll moments that may act on the aircraft while the spoilers are being retracted to the basic position.

In the spoiler control device, the irregularity detecting unit may determine whether the irregular movement of each of the spoilers is caused by irregularity in a position detector configured to detect a position of a rod connected to the spoiler and movable back and forth in a cylinder in the actuator, relative to the cylinder, and if the irregular movement of the spoiler is not caused by irregularity in the position detector, the angle difference determining unit may obtain, as the angle of the spoiler, the position of the rod and determine whether the difference between the angles of the left and right spoilers is equal to or less than the specified value, and if the irregular movement of the spoiler is caused by irregularity in the position detector, the angle difference determining unit may obtain, as the angle of the spoiler, a value detected by an actual measurement sensor configured to detect an actual angle of the spoiler and determine whether the difference between the angles of the left and right spoilers is equal to or less than the specified value.

The value detected by the actual measurement sensor contains fluctuations in the position of the spoiler caused by the wind pressure acting on the spoiler. When compared with the case where the value detected by the actual measurement sensor is used as the angle of the spoiler, fewer errors can be observed for the calculation of the difference between the angles of the left and right spoilers when the position of the rod detected by the position detector is used as the angle of the spoiler. For this reason, as described above, if no irregularity occurs in the position detector, the position of the rod detected by the position detector is used to calculate the difference between the angles. This makes it possible to calculate the difference between the angles accurately. On the other hand, if irregularity occurs in the position detector, the value detected by the position detector is hardly reliable. For this reason, as described above, if irregularity occurs in the position detector, the value detected by the actual measurement sensor is used as the angle of the spoiler. In this way, even if irregularity occurs in the position detector, the difference between the angles can be determined reasonably accurately.

In the spoiler control device, under an assumption that the angle of each of the spoilers takes a value of zero when the spoiler is at the basic position and takes a positive maximum value when the spoiler is at the deployed position, if the irregular movement is detected in a given one of the left and right spoilers with the angles of the left and right spoilers both taking a value greater than zero, the signal outputting unit may output the retracting signal for the given one of the left and right spoilers and refrain from outputting the retracting signal for the other of the left and right spoilers, and if the difference between the angles of the left and right spoilers becomes equal to or less than the specified value, the signal outputting unit may output the retracting signal for the other of the left and right spoilers. The configuration described above is suitable for reducing the roll moment acting on the aircraft when the left and right spoilers are retracted, for example, during braking of the aircraft using the left and right spoilers.

In the spoiler control device, if the irregular movement is detected in a given one of the left and right spoilers with the angles of the left and right spoilers taking different values, the signal outputting unit may output the retracting signal for the given one of the spoilers and refrain from outputting the retracting signal for the other of the left and right spoilers, and if the difference between the angles of the left and right spoilers becomes equal to or less than the specified value, the signal outputting unit may output the retracting signal to the other of the left and right spoilers. The configuration described above is suitable for reducing the roll moment acting on the aircraft when the left and right spoilers are retracted, for example, during roll flight of the aircraft where the angles of the left and right spoilers are different.

In the spoiler control device, under an assumption that the angle of each of the spoilers takes a value of zero when the spoiler is at the basic position and takes a positive maximum value when the spoiler is at the deployed position, if the irregular movement is detected in a given one of the left and right spoilers with the angle of the given one of the left and right spoilers taking a value greater than zero and the angle of the other of the left and right spoilers taking a value of zero, the signal outputting unit may output the retracting signal simultaneously to the left and right spoilers. According to the configuration described above, since it is not necessary to calculate the difference between the angles of the left and right spoilers, there is no burden for calculating the difference between the angles of the left and right spoilers.

To solve the above-described problems, a spoiler control method is applicable to an aircraft including left and right spoilers provided on left and right main wings, where when driven by an actuator, each spoiler is movable between a basic position positioned on a same plane as a corresponding one of the main wings and a deployed position on a plane tilted relative to the corresponding main wing. The spoiler control method includes the steps of detecting whether the left and right spoilers irregularly move toward the deployed position, obtaining angles formed by the left and right spoilers relative to the main wings and determining whether a difference between the obtained angles of the left and right spoilers is equal to or less than a specified value, and outputting a retracting signal designed to move the left and right spoilers back to the basic position. If the irregular movement is detected in a given one of the left and right spoilers, the signal outputting step outputs the retracting signal for the given one of the spoilers and refrains from outputting the retracting signal for the other of the left and right spoilers, and if the difference between the angles of the left and right spoilers becomes equal to or less than the specified value, the signal outputting step outputs the retracting signal for the other of the left and right spoilers.

It is assumed that the retraction of the left and right spoilers starts at the same time with a considerably large difference being provided between their angles. In this case, the difference between the angles is maintained while the left and right spoilers are being retracted and remains even after one of the left and right spoilers is retracted back to the basic position until the other is retracted back to the basic position. This means that roll moments keep acting on the aircraft until both of the spoilers are completely retracted.

The above-listed features of the spoiler control method are designed to address this issue. After the start of the retraction of one of the left and right spoilers that irregularly moves, the retraction of the other spoiler starts only after the difference in angle between the left and right spoilers has significantly decreased. In this way, after the start of the retraction of the other spoiler, the difference in angle between the left and right spoilers is considerably small and the roll moments thus hardly acts on the aircraft. As a result, the present invention can reduce the roll moments that may act on the aircraft while the spoilers are being retracted to the basic position.

To solve the above-described problems, a program for controlling a spoiler is applicable to an aircraft including left and right spoilers provided on left and right main wings, where when driven by an actuator, each spoiler is movable between a basic position positioned on a same plane as a corresponding one of the main wings and a deployed position on a plane tilted relative to the corresponding main wing. The program causes a computer to perform the steps of detecting whether the left and right spoilers irregularly move toward the deployed position, obtaining angles formed by the left and right spoilers relative to the main wings and determining whether a difference between the obtained angles of the left and right spoilers is equal to or less than a specified value, and outputting a retracting signal designed to move the left and right spoilers back to the basic position. If the irregular movement is detected in a given one of the left and right spoilers, the signal outputting step outputs the retracting signal for the given one of the spoilers and refrains from outputting the retracting signal for the other of the left and right spoilers, and if the difference between the angles of the left and right spoilers becomes equal to or less than the specified value, the signal outputting step outputs the retracting signal for the other of the left and right spoilers. The program may be stored on a non-transitory computer-readable storage medium.

It is assumed that the retraction of the left and right spoilers starts at the same time with a considerably large difference being provided between their angles. In this case, the difference between the angles is maintained while the left and right spoilers are being retracted and remains even after one of the left and right spoilers is retracted back to the basic position until the other is retracted back to the basic position. This means that roll moments keep acting on the aircraft until both of the spoilers are completely retracted.

The above-listed features of the program are designed to address this issue. After the start of the retraction of one of the left and right spoilers that irregularly moves, the retraction of the other spoiler starts only after the difference in angle between the left and right spoilers has significantly decreased. In this way, after the start of the retraction of the other spoiler, the difference in angle between the left and right spoilers is considerably small and the roll moments thus hardly acts on the aircraft. As a result, the present invention can reduce the roll moments that may act on the aircraft while the spoilers are being retracted to the basic position.

DESCRIPTION OF THE PREFERRED EMBODIMENTS

The following describes, with reference to the drawings, an embodiment of a spoiler control device applicable to an aircraft. In the following description, components and signals are described with reference signs being assigned thereto when they are discriminated from each other as left and right ones and without reference signs when they do not need to be discriminated from each other as left and right ones. For example, spoilers are referred to as a left spoiler 112 and a right spoiler 212 when they need to be discriminated as left and right ones and only as the spoilers when they do not need to be discriminated from each other.

The following description starts with describing the schematic configuration of spoilers and actuators.

Figure 1:
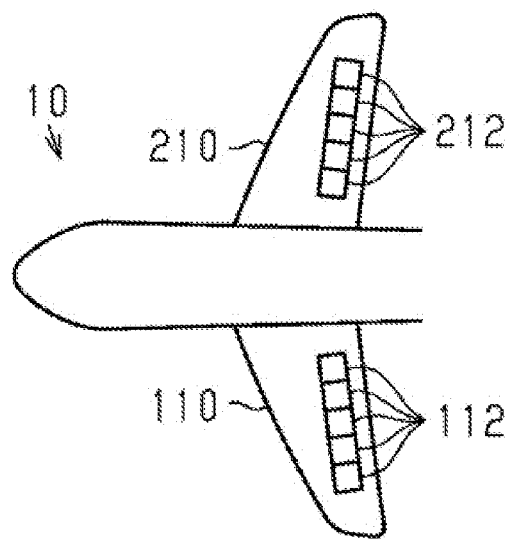
FIG. 1 is a schematic view of an aircraft.

As shown in FIG. 1, a spoiler, which is a moving surface, is attached to left and right main wings of an aircraft 10. The spoilers are moved both while the aircraft 10 is flying and while the aircraft 10 is moving before takeoff and after landing. On a left main wing 110, five left spoilers 112 are attached. The five left spoilers 112 are generally next to each other in the left-and-right direction of the aircraft 10 and behind the middle of the left main wing 110 in the front-and-back direction of the aircraft 10. On a right main wing 210, five right spoilers 212 are attached. The five right spoilers 212 are generally next to each other in the left-and-right direction of the aircraft 10 and behind the middle of the right main wing 210 in the front-and-back direction of the aircraft 10. The left and right main wings 110 and 210 and the left and right spoilers 112 and 212 are generally shaped like a plate.

The outermost one of the five left spoilers 112 of the left main wing 110 and the outermost one of the five right spoilers 212 of the right main wing 210 form a pair. In other words, the mentioned left and right spoilers 112 and 212 are symmetrically positioned with respect to the central axis line of the aircraft 10. The same applies to the remaining four left spoilers 112 and four right spoilers 212, which form pairs of left and right spoilers. As noted, the aircraft 10 includes, in total, five pairs of left and right spoilers on the left and right main wings 110 and 210. The following describes any one of the five pairs of spoilers.

Figure 2:
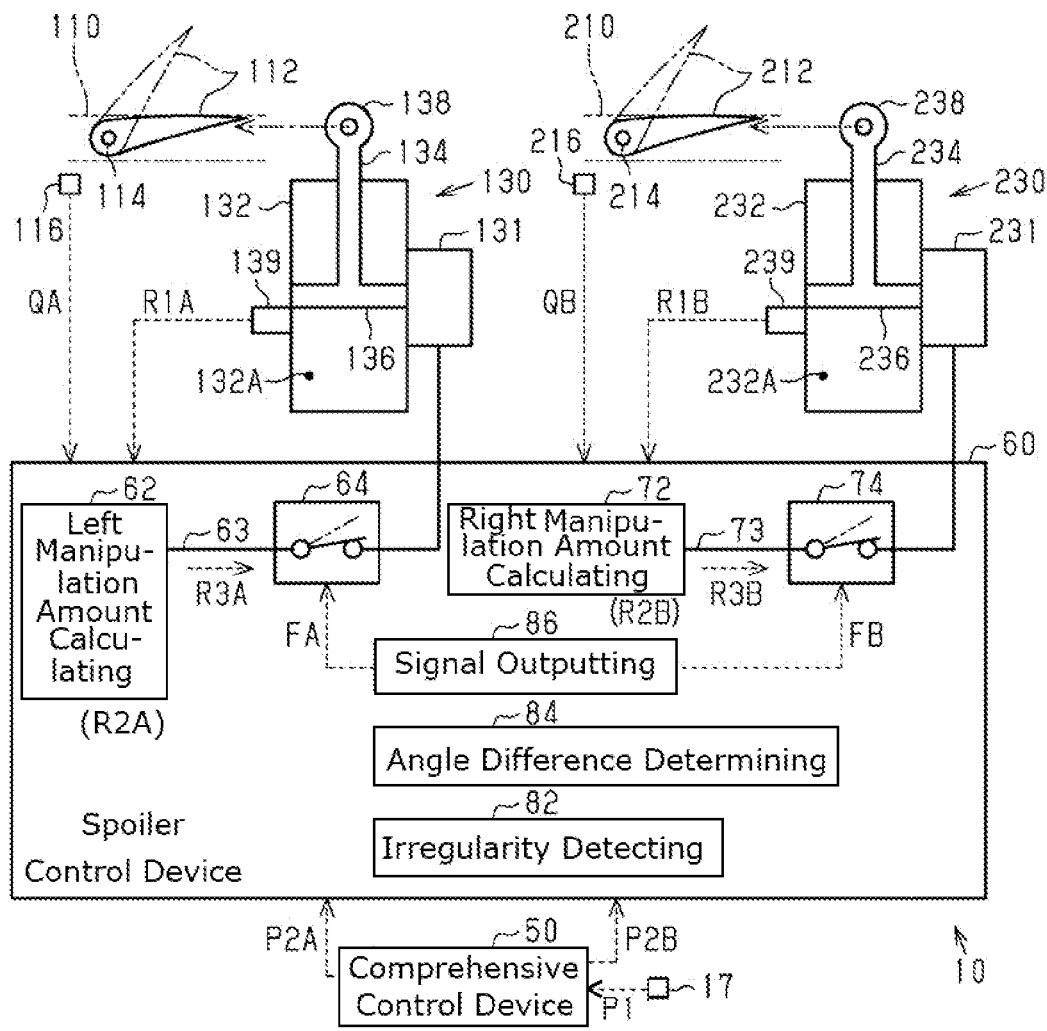
FIG. 2 schematically shows how to drive a spoiler.

As shown in FIG. 2, the left spoiler 112 is connected to the left main wing 110 via a rotation shaft 114. The left spoiler 112 is rotatable relative to the main wing 110 on the rotation shaft 114. The left spoiler 112 rotates integrally with the rotation shaft 114. The left spoiler 112 is rotated between a basic position (indicated by the solid line in FIG. 2) where the top surface of the left spoiler 112 is flush with the top surface of the main wing 110 and a deployed position (indicated by the alternate long and two short dashed line in FIG. 2) where the top surface of the left spoiler 112 is tilted upward with respect to the top surface of the main wing 110.

In the vicinity of the rotation shaft 114, a left actual measurement sensor 116 is arranged for detecting the rotational position of the rotation shaft 114 or a left spoiler actual measured angle QA. The left spoiler actual measured angle QA is equivalent to the actual angle of the left spoiler 112. When the left spoiler 112 is at the basic position, the left spoiler actual measured angle QA is zero. As the left spoiler 112 moves toward the deployed position, the left spoiler actual measured angle QA increases. As used herein, the angle of the spoiler denotes the angle of the spoiler with respect to the main wing.

To the left spoiler 112, a left actuator 130 is attached for driving the left spoiler 112. The left actuator 130 is an electrohydraulic system. The left actuator 130 has a tubular left cylinder 132. The interior of the left cylinder 132 constitutes a left fluid chamber 132A into which and from which a hydraulic fluid is fed and discharged. In the left fluid chamber 132A, a left rod 134 having a columnar shape is positioned coaxially with the left cylinder 132. The left rod 134 has ends in the central axis direction, from one of which on a first side a left piston 136 extends outwardly in the radial direction. The left piston 136 divides the left fluid chamber 132A into two sections. The left fluid chamber 132A applies a hydraulic pressure to the left piston 136, and the left rod 134 resultantly reciprocates in the central axis direction thereof. A part of the left rod 134 in the central axis direction on a second side opposite to the first side protrudes from the left cylinder 132. The other end of the left rod 134 in the central axis direction on the second side is a substantially annular left attaching portion 138. The left attaching portion 138 is attached to the left spoiler 112. As the left rod 134 reciprocates, this rotates the left spoiler 112. Specifically, as the left rod 134 moves to the second side in the central axis direction, the left spoiler 112 moves toward the deployed position. On the other hand, as the left rod 134 moves to the first side in the central axis direction, the left spoiler 112 moves toward the basic position.

To the left cylinder 132, a left position detector 139 is attached for detecting the position of the left rod 134 relative to the left cylinder 132. The position of the left rod 134 is defined as a separation distance between a predetermined reference position and the first-side end of the left rod 134 in the central axis direction. The predetermined reference position is the middle of the left cylinder 132 in the central axis direction thereof. The left position detector 139 is configured to detect a left rod actual measured distance R1A, which denotes the actual measured value of the separation distance. Since the reference position is defined as the middle of the left cylinder 132 in the central axis direction, the left rod actual measured distance R1A is a positive or negative value. In other words, when the left rod 134 is on the first side with respect to the middle of the left cylinder 132 in the central axis direction, the left rod actual measured distance R1A takes a negative value. On the other hand, when the left rod 134 is on the second side, the left rod actual measured distance R1A takes a positive value. As the left rod actual measured distance R1A increases, the angle of the left spoiler 112 increases. Specifically, the left position detector 139 includes an iron core attached to the left rod 134 and a coil surrounding the left rod 134 along its entire circumference. The left position detector 139 is configured to generate a voltage when the iron core moves within the coil along with the left rod 134. The level of this voltage is detected as the left rod actual measured distance R1A.

On the outer surface of the left cylinder 132, a left manifold 131 is fixed that has a hydraulic circuit for a hydraulic fluid defined therein. The hydraulic circuit includes a hydraulic control valve or the like for switching the flow path in the hydraulic circuit. The hydraulic fluid in the hydraulic circuit is fed into and discharged out of the left cylinder 132.

Like the left spoiler 112, the right spoiler 212 is connected to the right main wing 210 via a rotation shaft 214. The right spoiler 212 rotates between a basic position and a deployed position, which are defined in the same manner as those of the left spoiler 112. In the vicinity of the rotation shaft 214, a right actual measurement sensor 216 is arranged for detecting the rotational position of the rotation shaft 214 or a right spoiler actual measured angle QB.

To the right spoiler 212, a right actuator 230 is attached for driving the right spoiler 212. The right actuator 230 is configured in the same manner as the left actuator 130. Stated differently, the right actuator 230 is an electrohydraulic actuator. The right actuator 230 has a tubular right cylinder 232, in which a right rod 234 having a columnar shape is positioned coaxially with the right cylinder 232. The right rod 234 has ends in the central axis direction, from one of which on the first side a right piston 236 extends and halves a right fluid chamber 232A within the right cylinder 232. The right fluid chamber 232A applies a hydraulic pressure to the right piston 236, and the right rod 234 resultantly reciprocates. The other end of the right rod 234 in the central axis direction on the second side is outside the right cylinder 232 and forms a substantially annular right attaching portion 238. The right attaching portion 238 is attached to the right spoiler 212.

To the right cylinder 232, a right position detector 239 is attached for detecting the position of the right rod 234 relative to the right cylinder 232. The right position detector 239 is configured to detect a right rod actual measured distance R1B, which denotes the actual measured value of the separation distance and is defined in the same manner as the counterpart for the left position detector 139. On the outer surface of the right cylinder 232, a right manifold 231 similar to the left manifold 131 is fixed.

The following now describes how to control the left and right actuators 130 and 230.

The aircraft 10 has a comprehensive control device 50 mounted therein for comprehensively controlling the operations of the units of the aircraft 10. The comprehensive control device 50 may be formed of one or more processors that perform various processes in accordance with computer programs (software). Alternatively, the comprehensive control device 50 may be formed of one or more dedicated hardware circuits such as application-specific integrated circuits (ASICs) that perform at least a part of the various processes, or it may be formed of circuitry including a combination of such circuits. The processors include a CPU and a memory, such as a RAM or ROM. The memory stores program codes or instructions configured to cause the CPU to perform processes. The memory, or a computer-readable storage medium, encompasses any kind of available media accessible via a general-purpose or dedicated computer.

The comprehensive control device 50 receives a manipulation amount P1 of a yoke 17 provided in the cockpit of the aircraft 10. The comprehensive control device 50 calculates a left spoiler target angle P2A, which is the target value of the angle of the left spoiler 112 based on the manipulation amount P1 of the yoke 17, and outputs a signal related to the left spoiler target angle P2A. The comprehensive control device 50 also calculates a right spoiler target angle P2B, which is the target value of the angle of the right spoiler 212 based on the manipulation amount P1 of the yoke 17, and outputs a signal related to the right spoiler target angle P2B.

The aircraft 10 has a spoiler control device 60 mounted therein for controlling the left and right actuators 130 and 230. The spoiler control device 60 may be formed of one or more processors that perform various processes in accordance with computer programs (software). The processes performed by the spoiler control device 60 or the processors include a spoiler control method. The spoiler control method includes an irregularity detecting procedure, an angle difference determining procedure, and a signal outputting procedure described below. Alternatively, the spoiler control device 60 may be formed of one or more dedicated hardware circuits such as application-specific integrated circuits (ASICs) that perform at least a part of the various processes, or it may be formed of circuitry including a combination of such circuits. The processors include a CPU and a memory, such as a RAM or ROM. The memory stores program codes or instructions configured to cause the CPU to perform processes. The memory, in other words, a computer-readable storage medium, encompasses any kind of available media accessible via a general-purpose or dedicated computer. The programs stored in the computer-readable storage medium include a spoiler control program. The spoiler control program causes a computer to perform the irregularity detecting procedure, the angle difference determining procedure, and the signal outputting procedure.

The spoiler control device 60 receives a signal related to the left rod actual measured distance R1A, which is detected by the left position detector 139. The spoiler control device 60 also receives a signal related to the left spoiler actual measured angle QA, which is detected by the left actual measurement sensor 116. The spoiler control device 60 also receives a signal related to the right rod actual measured distance 111B, which is detected by the right position detector 239. The spoiler control device 60 also receives a signal related to the right spoiler actual measured angle QB, which is detected by the right actual measurement sensor 216. The spoiler control device 60 also receives the signal related to the left spoiler target angle P2A and a signal related to the right spoiler target angle P2B, which are output from the comprehensive control device 50.

The spoiler control device 60 stores therein a translation map showing the relation between the rod actual measured distance and the angle of the spoiler in advance. The spoiler control device 60 utilizes this translation map to perform translation between the rod actual measured distance and the angle of the spoiler as required. The following description does not mention the use of the translation map for the translation between the rod actual measured distance and the angle of the spoiler every time the translation map is used.

The spoiler control device 60 includes a left manipulation amount calculating unit 62 for calculating a left rod manipulation amount R3A, which is the target manipulation amount of the left rod 134. The left manipulation amount calculating unit 62 obtains the left spoiler target angle P2A and also translates the obtained left spoiler target angle P2A into a left rod target distance R2A, which represents the separation distance between the left rod 134 and the reference position. The left manipulation amount calculating unit 62 obtains the left rod actual measured distance R1A and also calculates the left rod manipulation amount R3A such that the difference between the left rod actual measured distance R1A and the left rod target distance R2A can be compensated for. For example, when the left rod actual measured distance R1A is less than the left rod target distance R2A, the left rod manipulation amount R3A is calculated as a positive value such that the left rod 134 can be moved to the second side in the central axis direction of the left cylinder 132. On the other hand, when the left rod actual measured distance R1A is greater than the left rod target distance R2A, the left rod manipulation amount R3A is calculated as a negative value. On completion of the calculation of the left rod manipulation amount R3A, the left manipulation amount calculating unit 62 outputs a signal related to the left rod manipulation amount R3A. Here, the signal related to the left rod manipulation amount R3A is substantially an electrical signal obtained by converting the left rod manipulation amount R3A and designed for driving the hydraulic control valve of the left manifold 131.

The circuit constituting the left manipulation amount calculating unit 62 is connected to the hydraulic control valve of the left manifold 131 via a communication line 63. The communication line 63 passes through a left actuator connection switch 64 for switching whether the communication line 63 is connected or disconnected. While the left actuator connection switch 64 establishes the connection, the signal related to the left rod manipulation amount R3A is input into the hydraulic control valve. While the left actuator connection switch 64 maintains the disconnection, on the other hand, this signal is blocked from being input into the hydraulic control valve. The left actuator 130 is configured to, when this signal is blocked from being input into the hydraulic control valve, operate to move the left spoiler 112 back to the basic position.

The spoiler control device 60 includes a right manipulation amount calculating unit 72 for calculating a right rod manipulation amount R3B, which is the target manipulation amount of the right rod 234. The right manipulation amount calculating unit 72 calculates the right rod manipulation amount R3B in the same manner as the left manipulation amount calculating unit 62. To be more specific, the right manipulation amount calculating unit 72 translates the right spoiler target angle P2B into the right rod target distance R2B and also calculates the right rod manipulation amount R3B such that the difference between the right rod actual measured distance 111B and the right rod target distance R2B can be compensated for. The right manipulation amount calculating unit 72 outputs a signal related to the right rod manipulation amount R3B.

Like the circuit constituting the left manipulation amount calculating unit 62, the circuit constituting the right manipulation amount calculating unit 72 is connected to the hydraulic control valve of the right manifold 231 via the communication line 73. The communication line 73 passes through a right actuator connection switch 74 for switching whether the communication line 73 is connected or disconnected. The right actuator connection switch 74 functions in the same manner as the left actuator connection switch 64. Like the left actuator 130, the right actuator 230 is configured to move the right spoiler 212 back to the basic position, when the right actuator connection switch 74 is switched to the disconnected state so that the signal related to the right rod manipulation amount R3B is blocked from being input into the right actuator 230.

The spoiler control device 60 includes an irregularity detecting unit 82 for detecting whether or not the left and right spoilers 112 and 212 irregularly move toward the deployed position. If the spoilers irregularly move, this means that the spoilers move toward the deployed position without the yoke 17 being manipulated to move the spoilers toward the deployed position.

The irregularity detecting unit 82 detects whether or not the left and right spoilers 112 and 212 irregularly move in any one of three irregularity modes. The following describes the three irregularity modes taking the left spoiler 112 as an example, but the same applies to the right spoiler 212. In all of the three irregularity modes, an inappropriate value is calculated as the left rod manipulation amount R3A, which designates the movement to be made by the left spoiler 112, and the left spoiler 112 resultantly moves to the deployed position irregularly. The inappropriate value being calculated as the left rod manipulation amount R3A specifically means that the left rod manipulation amount R3A is inappropriately a positive value.

As described above, the left rod manipulation amount R3A is calculated based on the left spoiler target angle P2A and the left rod actual measured distance R1A input into the left manipulation amount calculating unit 62. In a first irregularity mode, irregularity occurs in the circuit of the comprehensive control device 50 configured to calculate the left spoiler target angle P2A, which is one of the input values mentioned above. In the first irregularity mode, an irregularity in the circuit of the comprehensive control device 50 results in an inappropriate value being calculated as the left spoiler target angle P2A. In other words, the calculated value indicates that the left spoiler 112 may be moved toward the deployed position and a positive value is accordingly calculated as the left rod manipulation amount R3A.

In a second irregularity mode, irregularity occurs in the left position detector 139 configured to detect the left rod actual measured distance R1A, which is the other of the input values used to calculate the left rod manipulation amount R3A. In the second irregularity mode, an irregularity in the left position detector 139 results in an inappropriate value being detected as the left rod actual measured distance R1A, and a positive value is accordingly calculated as the left rod manipulation amount R3A. Specifically, if a short circuit occurs in the coil of the left position detector 139 for some reason, the coil does not generate an appropriate voltage. Accordingly, the left position detector 139 outputs zero as the left rod actual measured distance R1A, irrespective of the position of the left rod 134. In such a case, if the left rod target distance R2A is a positive value, a positive value is calculated as the left rod manipulation amount R3A since the left rod manipulation amount R3A is determined such that the left rod actual measured distance R1A can approach the left rod target distance R2A. If the left rod actual measured distance R1A continues to be zero and the left rod target distance R2A continues to be a positive value, the left rod manipulation amount R3A remains positive. As a consequence, the left spoiler 112 continues to move irregularly toward the deployed position.

In a third irregularity mode, irregularity occurs in the circuit of the left manipulation amount calculating unit 62 configured to calculate the left rod manipulation amount R3A. In the third irregularity mode, an irregularity in the circuit of the left manipulation amount calculating unit 62 results in a positive value being calculated as the left rod manipulation amount R3A. Accordingly, the left spoiler 112 irregularly moves toward the deployed position.

The spoiler control device 60 includes an angle difference determining unit 84 for determining whether the difference in angle between the left spoiler 112 and the right spoiler 212 is equal to or less than a specified value ZK. The angle difference determining unit 84 makes a determination relating to the above difference in angle when the irregularity detecting unit 82 detects irregular movement of the left or right spoiler 112 or 212 in any one of the three irregularity modes.

If the irregularity detecting unit 82 detects irregular movement in the first or third irregularity mode, in other words, if the irregularity detecting unit 82 detects irregular movement not caused by the irregularity in the position detector, the angle difference determining unit 84 obtains the left rod actual measured distance R1A and the right rod actual measured distance R1B, converts these values into the angles of the spoilers and holds them. In other words, the angle difference determining unit 84 obtains the left rod actual measured distance R1A as the angle of the left spoiler 112 and obtains the right rod actual measured distance R1B as the angle of the right spoiler 212. The angle difference determining unit 84 then determines whether the difference in angle between the spoilers is equal to or less than the specified value ZK.

On the other hand, if the irregularity detecting unit 82 detects irregular movement in the second irregularity mode, in other words, the irregularity detecting unit 82 detects irregular movement caused by the irregularity in the position detector, the angle difference determining unit 84 obtains the left spoiler actual measured angle QA and the right spoiler actual measured angle QB, corrects these values and holds the results. Here, the left spoiler actual measured angle QA contains fluctuation in the position of the left spoiler 112 caused by the wind pressure acting on the left spoiler 112. The same applies to the right spoiler actual measured angle QB. The correction mentioned above is designed to eliminate this fluctuation. As noted, with taking into consideration the correction made to eliminate the fluctuation, the angle difference determining unit 84 obtains the corrected left spoiler actual measured angle QA as the angle of the left spoiler 112 and obtains the corrected right spoiler actual measured angle QB as the angle of the right spoiler 212. The angle difference determining unit 84 then determines whether the difference in angle between the spoilers is equal to or less than the specified value ZK.

The angle difference determining unit 84 stores therein the specified value ZK mentioned above in advance. If the angle of the left spoiler 112 is different from the angle of the right spoiler 212, roll moments act on the aircraft 10. The specified value ZK mentioned above is determined through experiments and simulations and is the maximum difference in angle that can only cause negligible roll moments from the perspective of the flight of the aircraft 10.

The spoiler control device 60 includes a signal outputting unit 86 for outputting, as an instruction signal, a left retracting signal FA designed to move the left spoiler 112 back to the basic position. The left retracting signal FA is a disconnection signal for switching the left actuator connection switch 64 to the disconnected state. The signal outputting unit 86 also outputs, as an instruction signal, a right retracting signal FB designed to move the right spoiler 212 back to the basic position. The right retracting signal FB is a disconnection signal for switching the right actuator connection switch 74 to the disconnected state.

When the irregularity detecting unit 82 detects that one of the left and right spoilers 112 and 212 is irregularly moving, the signal outputting unit 86 outputs the retracting signal to the irregularly moving spoiler. On the other hand, the signal outputting unit 86 refrains from outputting the retracting signal to the spoiler that is not irregularly moving. The signal outputting unit 86 outputs the retracting signal to the spoiler that is not irregularly moving, if the angle difference determining unit 84 determines that the difference in comparison angle between the left spoiler 112 and the right spoiler 212 is equal to or less than the specified value ZK. The signal outputting unit 86 performs such a time difference signal outputting procedure.

The signal outputting unit 86 performs the above-mentioned time difference signal outputting procedure in various situations experienced by the aircraft 10, for example, when the aircraft 10 is braking for landing or rolling during flight. While the aircraft 10 is braking for landing, the left and right spoilers 112 and 212 are controlled to form the same angle greater than zero. While the aircraft 10 is rolling during flight, the left and right spoilers 112 and 212 are controlled to form different angles.

While one of the left and right spoilers 112 and 212 forms an angle of greater than zero degrees and the other forms an angle of zero degrees, irregular movement may be detected in the former one of the left and right spoilers 112 and 212. If such is the case, the signal outputting unit 86 performs a simultaneous signal outputting procedure for outputting the retracting signal simultaneously to both of the spoilers instead of performing the time difference signal outputting procedure. When irregular movement is detected in one of the left and right spoilers 112 and 212, the irregularity detected spoiler may form a smaller angle than the other. In this case, the signal outputting unit 86 also performs a simultaneous signal outputting procedure for outputting a retracting signal simultaneously to both of the spoilers instead of performing the time difference signal outputting procedure. The time difference signal outputting procedure and the simultaneous signal outputting procedure each correspond to the signal outputting procedure.

The following now describes the irregularity detecting procedure to be performed by the irregularity detecting unit 82. The irregularity detecting procedure is designed to detect whether or not one of the left and right spoilers 112 and 212 irregularly moves toward the deployed position. The irregularity detecting procedure can detect irregular movement in the first, second and third irregularity modes.

The irregularity detecting unit 82 continuously obtains, for detecting irregular movement in the first irregularity mode of the left spoiler 112, the manipulation amount P1 of the yoke 17, the left spoiler target angle P2A calculated by the comprehensive control device 50, and the left rod manipulation amount R3A calculated by the left manipulation amount calculating unit 62. The irregularity detecting unit 82 detects irregular movement in the first irregularity mode for the left spoiler 112 if a first condition is satisfied. The first condition is that the left rod manipulation amount R3A continues to be positive and the left spoiler target angle P2A continues to be excessively greater than the manipulation amount P1 of the yoke 17. For example, if the left spoiler target angle P2A is excessively large irrespective of that the manipulation amount P1 of the yoke 17 indicates that the left spoiler 112 be positioned in the basic position, an irregularity is suspected of occurring in the circuit of the comprehensive control device 50. In light of the above, the irregularity detecting unit 82 determines that irregularity is occurring in the circuit of the comprehensive control device 50 if the first condition is satisfied, thereby detecting irregular movement in the first irregularity mode. The irregularity detecting unit 82 detects irregular movement in the first irregularity mode of the right spoiler 212 in the same manner as for the left spoiler 112.

The irregularity detecting unit 82 continuously obtains, for detecting irregular movement in the second irregularity mode of the left spoiler 112, the left rod actual measured distance R1A detected by the left position detector 139, the left spoiler actual measured angle QA detected by the left actual measurement sensor 116, and the left rod manipulation amount R3A calculated by the left manipulation amount calculating unit 62. The irregularity detecting unit 82 detects irregular movement in the second irregularity mode for the left spoiler 112 if a second condition is satisfied. The second condition is that the left rod manipulation amount R3A continues to be positive, the left rod actual measured distance R1A continues to be zero, and the temporal change shown by the left rod actual measured distance R1A is inconsistent with the temporal change shown by the left spoiler actual measured angle QA. For example, if the left rod actual measured distance R1A remains zero irrespective of that the left spoiler actual measured angle QA keeps increasing, irregularity is suspected of occurring in the left position detector 139. In light of the above, the irregularity detecting unit 82 determines that irregularity is occurring in the left position detector 139 if the second condition is satisfied, thereby detecting irregular movement in the second irregularity mode. The irregularity detecting unit 82 detects irregular movement in the second irregularity mode of the right spoiler 212 in the same manner as for the left spoiler 112.

The irregularity detecting unit 82 continuously obtains, for detecting irregular movement in the third irregularity mode of the left spoiler 112, the left spoiler target angle P2A calculated by the comprehensive control device 50, and the left rod manipulation amount R3A calculated by the left manipulation amount calculating unit 62. The irregularity detecting unit 82 detects irregular movement in the third irregularity mode for the left spoiler 112 if a third condition is satisfied. The third condition is that the left rod manipulation amount R3A continues to be positive and the temporal change shown by the left spoiler target angle P2A is inconsistent with the temporal change shown by the left rod manipulation amount R3A. For example, if the left rod manipulation amount R3A continues to be positive for an excessively long period of time while the left spoiler target angle P2A remains constant, irregularity is suspected of occurring in the circuit of the left manipulation amount calculating unit 62. In light of the above, the irregularity detecting unit 82 determines that irregularity is occurring in the circuit of the left manipulation amount calculating unit 62 if the third condition is satisfied, thereby detecting irregular movement in the third irregularity mode. The irregularity detecting unit 82 detects irregular movement in the third irregularity mode for the right spoiler 212 in the same manner as for the left spoiler 112.

A reference time is defined to determine whether the left rod manipulation amount R3A continues to be positive in detecting irregularity in the first to third irregularity modes. The irregularity detecting unit 82 defines this reference time such that the reference time increases as the left rod manipulation amount R3A decreases. Accordingly, a longer time is required to complete the detection of the irregular movement when the left rod manipulation amount R3A is a small positive value than when the left rod manipulation amount R3A is a large positive value.

The following now describes a spoiler retracting procedure to be performed by the angle difference determining unit 84 and the signal outputting unit 86. This spoiler retracting procedure is designed to retract both of the left and right spoilers 112 and 212 into the basic position when irregular movement is detected in one of the left and right spoilers 112 and 212.

Figure 3:
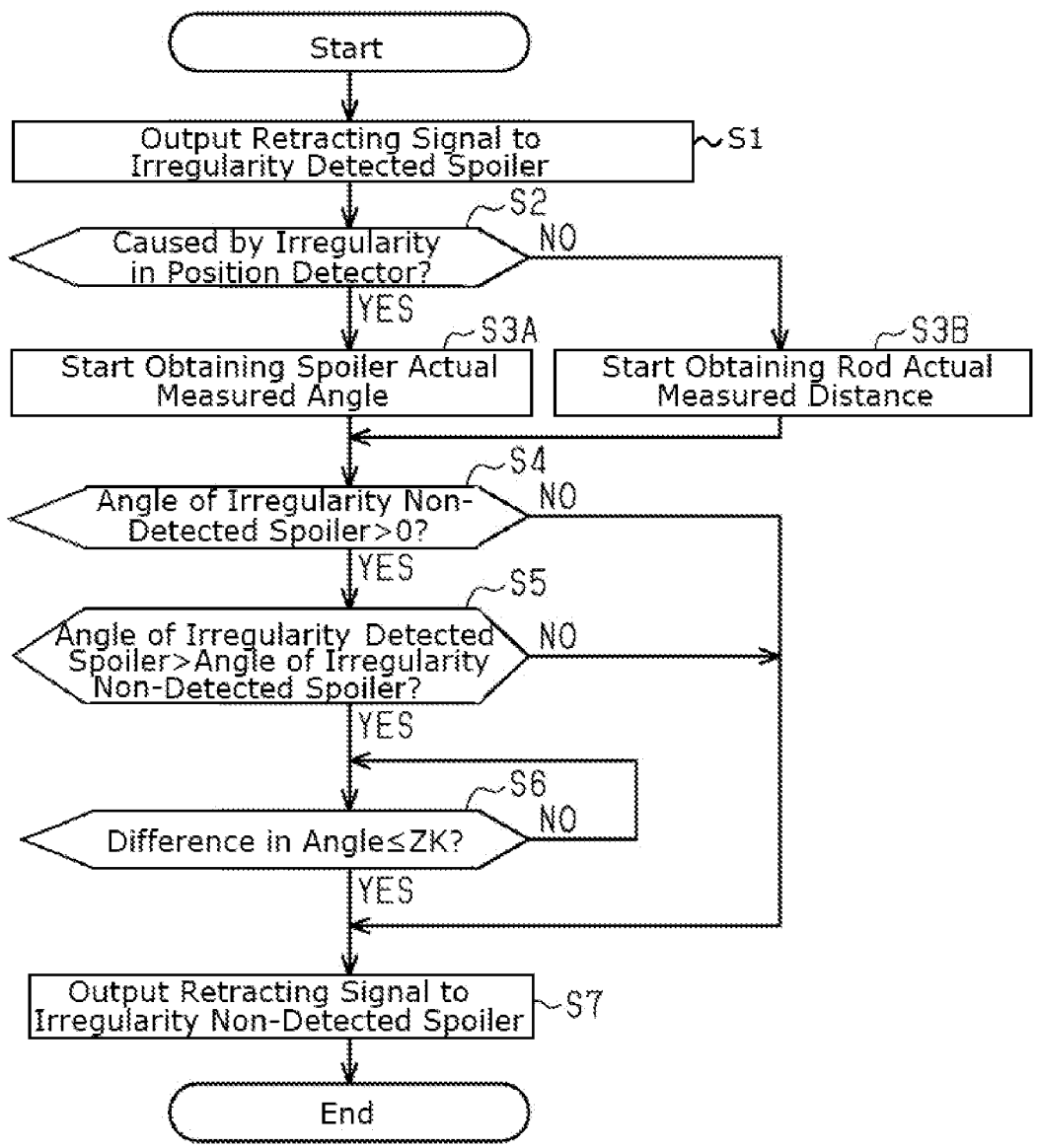
FIG. 3 is a flowchart showing a procedure of retracting a spoiler.

When the irregularity detecting unit 82 detects irregular movement in any one of the first, second and third irregularity modes for one of the left and right spoilers 112 and 212, the signal outputting unit 86 starts the spoiler retracting procedure. As shown in FIG. 3, the signal outputting unit 86 first performs a step S1. In the step S1, the signal outputting unit 86 outputs the retracting signal to one of the spoilers for which irregular movement is detected (hereinafter, referred to as the irregularity detected spoiler). In other words, the signal outputting unit 86 outputs the disconnection signal to the actuator connection switch associated with the irregularity detected spoiler. As a result of this, the actuator connection switch is switched to the disconnected state. The actuator then moves accordingly, so that the irregularity detected spoiler starts moving toward the basic position. The step S1 is referred to as the signal outputting procedure. After performing the step S1, the signal outputting unit 86 allows the procedure to proceed to a step S2.

In the step S2, the angle difference determining unit 84 determines whether the irregular movement of the irregularity detected spoiler is caused by irregularity in the position detector. The angle difference determining unit 84 determines that the irregular movement of the spoiler is not caused by irregularity in the position detector, if the irregularity detecting unit 82 detects irregular movement in the first or third mode (step S2: NO). In this case, the angle difference determining unit 84 allows the procedure to proceed to a step S3B and starts obtaining the rod actual measured distance for the irregularity detected spoiler and the other spoiler, in other words, the irregularity non-detected spoiler. Obtaining the rod actual measured distance for both of the spoilers, the angle difference determining unit 84 converts the obtained rod actual measured distances into the spoiler angles and holds them. The angle difference determining unit 84 continues to obtain the rod actual measured distance until the spoiler retracting procedure ends. After performing the step S3B, the angle difference determining unit 84 allows the procedure to proceed to a step S4.

On the other hand, in the determining step S2, if the irregularity detecting unit 82 detects irregular movement in the second mode, the angle difference determining unit 84 determines that the irregular movement of the spoiler is caused by irregularity in the position detector (step S2: YES). In this case, the angle difference determining unit 84 allows the procedure to proceed to a step S3A and starts obtaining the spoiler actual measured angle for both of the irregularity detected spoiler and the irregularity non-detected spoiler. The angle difference determining unit 84 corrects the obtained spoiler actual measured angles and treats the resulting angles as the angles of the spoilers. The angle difference determining unit 84 continues to obtain the spoiler actual measured angle until the spoiler retracting procedure ends. After performing the step S3A, the angle difference determining unit 84 allows the procedure to proceed to the step S4.

In the step S4, the angle difference determining unit 84 determines whether the irregularity non-detected spoiler forms an angle of greater than zero degrees. If the irregularity non-detected spoiler forms an angle of zero degrees (step S4: NO), the angle difference determining unit 84 allows the procedure to proceed to a step S7.

In the step S7, the signal outputting unit 86 outputs the retraction signal or the disconnection signal to the actuator connection switch associated with the irregularity non-detected spoiler. As a result of this, the actuator connection switch is switched to the disconnected state. If the determination made in the step S4 indicates NO and the procedure is allowed to proceed to the step S7, the irregularity non-detected spoiler maintains its state as it has already been positioned in the basic position. Since the actuator connection switch is switched to the disconnected state, however, the subsequent use of the spoiler is suspended. After performing the step S7, the signal outputting unit 86 terminates the series of steps in the spoiler retracting procedure. The step S7 is referred to as the signal outputting procedure. The step S7 following the determination indicating NO made in the step S4 constitutes the above-described simultaneous signal outputting procedure.

If the irregularity non-detected spoiler forms an angle of greater than zero degrees in the determining step S4 (step S4: YES), the angle difference determining unit 84 allows the procedure to proceed to the step S5.

In the step S5, the angle difference determining unit 84 determines whether the irregularity detected spoiler forms a greater angle than the irregularity non-detected spoiler. If the angle of the irregularity detected spoiler is equal to or less than the angle of the irregularity non-detected spoiler (step S5: NO), the angle difference determining unit 84 allows the procedure to proceed to a step S7. In this case, in the step S7, the signal outputting unit 86 outputs the retraction signal to the actuator connection switch associated with the irregularity non-detected spoiler. As a result of this, the actuator connection switch is switched to the disconnected state, and the irregularity non-detected spoiler starts moving toward the basic position. As noted, after performing the step S7, the signal outputting unit 86 terminates the series of steps in the spoiler retracting procedure. The step S7 following the determination indicating NO made in the step S5 constitutes the above-described simultaneous signal outputting procedure.

If the angle of the irregularity detected spoiler is greater than the angle of the irregularity non-detected spoiler in the step S5 (step S5: YES), on the other hand, the angle difference determining unit 84 allows the procedure to proceed to a step S6.

In the step S6, the angle difference determining unit 84 determines whether the difference in angle between the irregularity detected spoiler and the irregularity non-detected spoiler is equal to or less than the specified value ZK. If the difference in angle between the irregularity detected spoiler and the irregularity non-detected spoiler is greater than the specified value ZK (step S6: NO), the angle difference determining unit 84 performs the step S6 again. The angle difference determining unit 84 repeatedly performs the step S6 until the difference in angle between the spoilers becomes equal to or less than the specified value ZK. If the difference in angle between the spoilers becomes equal to or less than the specified value ZK (step S6: YES), the angle difference determining unit 84 allows the procedure to proceed to the step S7. The step S6 is referred to as the angle difference determining procedure.

In the step S7, the signal outputting unit 86 outputs the retraction signal to the actuator connection switch associated with the irregularity non-detected spoiler. As a result of this, the irregularity non-detected spoiler starts moving toward the basic position. After this, the signal outputting unit 86 terminates the series of steps in the spoiler retracting procedure. The step S1 and the step S7 following the determination indicating YES made in the step S6 constitute the time difference signal outputting procedure.

The following describes the effects of the present embodiment.

A) while Aircraft 10 is Braking

Figure 4:
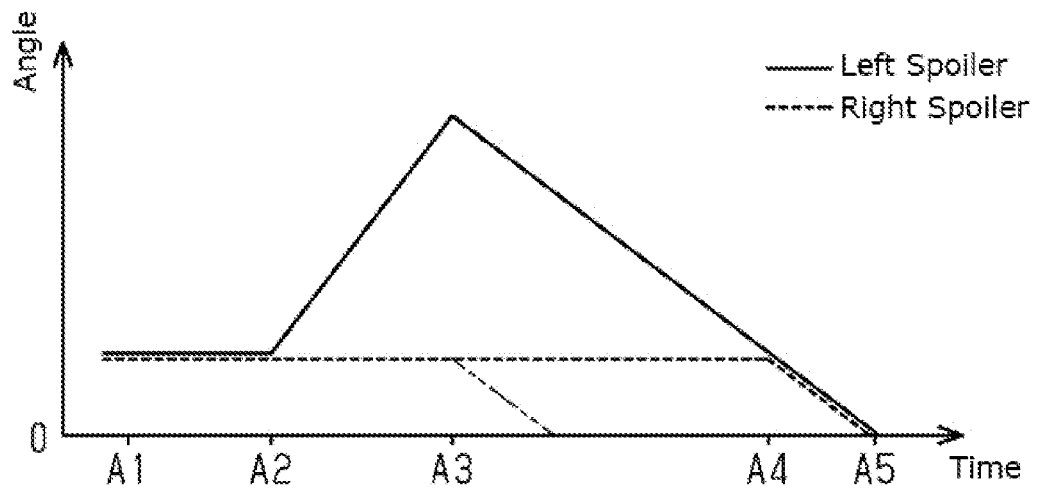
FIG. 4 is a time chart showing, as an example, how the angle of a spoiler changes over time.

The following case is assumed. At and after a timing A1 within a period during which the aircraft 10 is braking, the left spoiler 112 is controlled to maintain a predetermined braking angle that falls between the basic position and the deployed position as shown by the solid line in FIG. 4 and the right spoiler 212 is controlled to maintain the predetermined braking angle as shown by the dotted line in FIG. 4. At a timing A2 following the timing A1, irregularity in the second irregularity mode, in other words, irregularity caused by the left position detector 139, occurs in the left spoiler 112. In this case, as shown by the solid line in FIG. 4, the left spoiler 112 irregularly moves toward the deployed position after the timing A2. At a timing A3 following the timing A2, the irregularity detecting unit 82 detects irregular movement in the second irregularity mode for the left spoiler 112.

If the irregularity detecting unit 82 detects irregular movement at the timing A3, the signal outputting unit 86 outputs the left retracting signal FA to the left spoiler 112 for which irregular movement is detected (step S1). As a result of this, the left spoiler 112 starts moving toward the basic position as shown by the solid line in FIG. 4. At this point of time, the signal outputting unit 86 refrains from outputting the right retracting signal FB to the right spoiler 212. Therefore, the right spoiler 212 maintains the braking angle as shown by the dotted line in FIG. 4 after the timing A3, where the left spoiler 112 starts moving toward the basic position.

After the timing A3, the left spoiler 112 moves toward the basic position, so that the left spoiler 112 gradually approaches the position of the right spoiler 212. As a result, the difference between their angles diminishes. Since the irregular movement of the left spoiler 112 is caused by the left position detector 139 (step S2: YES), the angle difference determining unit 84 obtains the left spoiler actual measured angle QA and the right spoiler actual measured angle QB as the angles of the respective spoilers (step S3A). If the difference in angle between the spoilers becomes equal to or less than the specified value ZK at a timing A4 following the timing A3 (step S6: YES), the signal outputting unit 86 outputs the right retracting signal FB to the right spoiler 212 (step S7). As a result of this, the right spoiler 212 starts moving toward the basic position as shown by the dotted line in FIG. 4.

After this, the left and right spoilers 112 and 212 move toward the basic position while maintaining a significantly small difference in angle therebetween. At a timing A5, the left and right spoilers 112 and 212 are both positioned at the basic position.

(B) While Aircraft 10 is Rolling During Flight

Figure 5:
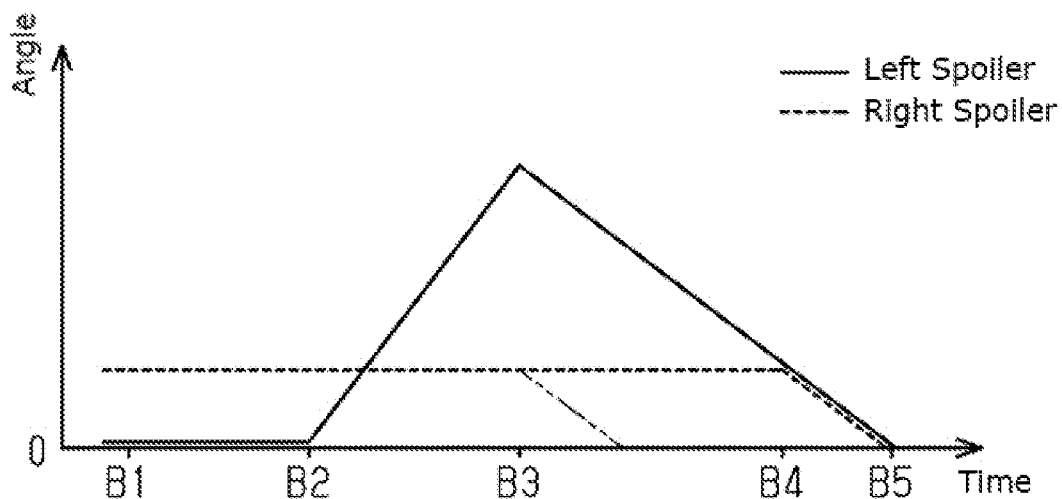
FIG. 5 is a time chart showing, as an example, how the angle of a spoiler changes over time.

The following case is assumed. At and after a timing B1 within a period during which the aircraft 10 is rolling during flight, the left spoiler 112 is controlled to be positioned at the basic position as shown by the solid line in FIG. 5 and the right spoiler 212 is controlled to maintain a predetermined rolling angle as shown by the dotted line in FIG. 5. At a timing B2, irregularity in the first irregularity mode, in other words, irregularity caused by the circuit of the comprehensive control device occurs in the left spoiler 112. In this case, as shown by the solid line in FIG. 5, the left spoiler 112 irregularly moves toward the deployed position after the timing B2. At a timing B3 following the timing B2, the irregularity detecting unit 82 detects irregular movement in the first irregularity mode for the left spoiler 112. In this example, at the timing B3, the left spoiler 112 is closer to the deployed position than the right spoiler 212 is.

If the irregularity detecting unit 82 detects irregular movement at the timing B3, the signal outputting unit 86 outputs the left retracting signal FA for the left spoiler 112 (step S1) as is done in the above braking case. Accordingly, the left spoiler 112 starts moving toward the basic position as shown by the solid line in FIG. 5. At this point of time, the signal outputting unit 86 refrains from outputting the right retracting signal FB to the right spoiler 212. Therefore, the right spoiler 212 maintains the rolling angle as shown by the dotted line in FIG. 5 after the timing B3, where the left spoiler 112 starts moving toward the basic position.

After the timing B3, the left spoiler 112 moves toward the basic position, so that the left spoiler 112 gradually approaches the position of the right spoiler 212. As a result, the difference between their angles diminishes. Since the irregular movement of the left spoiler 112 is not caused by irregularity in the left position detector 139 (step S2: NO), the angle difference determining unit 84 obtains the left rod actual measured distance R1A and the right rod actual measured distance 111B as the angles of the respective spoilers (step S3A). If the difference in angle between the spoilers becomes equal to or less than the specified value ZK at a timing B4 following the timing B3 (step S6: YES), the signal outputting unit 86 outputs the right retracting signal FB to the right spoiler 212 (step S7). As a result of this, the right spoiler 212 starts moving toward the basic position as shown by the dotted line in FIG. 5.

After this, the left and right spoilers 112 and 212 move toward the basic position while maintaining a significantly small difference in angle therebetween, as is done in the braking case. At a timing B5, the left and right spoilers 112 and 212 are both positioned at the basic position.

Advantageous effects of the above embodiment will be now described.

(1) When there is a difference in angle between the left spoiler 112 and the right spoiler 212, roll moments act on the aircraft 10. In relation to the above-described braking case, the right retracting signal FB for the right spoiler 212 may be also output at the timing A3, where the left retracting signal FA for the left spoiler 112 is output. If such is the case, as shown by the alternate long and two short dashed line in FIG. 4, the right spoiler 212 also starts moving toward the basic position at the timing A3. This means that the left and right spoilers start to be retracted with a considerably large difference being maintained between their angles. In this case, while these spoilers are being retracted, the difference in angle between these spoilers is maintained. Even after the right spoiler 212 is put back to the basic position, the difference in angle remains until the left spoiler 112 is put back to the basic position. This means that the roll moments continue to act on the aircraft 10 until both of the spoilers are completely retracted. In relation to the above-described rolling during flight case, the right retracting signal FB for the right spoiler 212 may be also output at the timing B3, where the left retracting signal FA for the left spoiler 112 is output. If such is the case, as shown by the alternate long and two short dashed line in FIG. 5, the right spoiler 212 also starts moving toward the basic position at the timing B3. This means that the left and right spoilers are retracted with a considerably large difference being maintained between their angles. The roll moments continue to act on the aircraft 10 until the left spoiler 112 is put back to the basic position. It is not desirable that the roll moments continue to act on the aircraft as described above. In particular, when irregular movement in the second mode occurs, in other words, irregularity occurs in the left position detector 139 and the left rod actual measured distance R1A is zero, the left rod manipulation amount R3A continues to be a small positive value provided that the left rod target distance R2A is slightly greater than zero. In this case, it takes a significantly long time until the irregularity detecting unit 82 can detect irregular movement due to the above conditions defined for the irregularity detection. In this case, the roll moments continue to act on the aircraft 10 for a considerably long time, which is not desirable.

To address this issue, in the spoiler retracting procedure of the above-described embodiment, the time difference signal outputting procedure is performed. Specifically, after the retraction of the left spoiler 112 starts (step S1), the retraction of the right spoiler 212 does not start (step S7) until the difference in angle between the spoilers becomes very small (step S6: YES). In this case, since the difference in angle between the spoilers is considerably small after the start of the retraction of the right spoiler 212, the roll moments hardly act on the aircraft 10. This can reduce the roll moments acting on the aircraft 10 while the spoilers are moving back to the basic position due to the irregular movement of the left spoiler 112 when, for example, the aircraft 10 is braking or rolling during flight.

(2) The left spoiler actual measured angle QA detected by the left actual measurement sensor 116 contains fluctuations in the position of the left spoiler 112 caused by the wind pressure acting on the left spoiler 112. Therefore, in order to use the left spoiler actual measured angle QA as the angle of the left spoiler 112, the left spoiler actual measured angle QA is corrected to eliminate the fluctuations and the result is treated as the angle of the left spoiler 112. The angle of the left spoiler 112 can be more accurately defined when the left rod actual measured distance R1A detected by the left position detector 139 is translated into an angle and the resulting angle is used as the angle of the left spoiler 112 than when the above corrected angle is used. The same applies to the angle of the right spoiler 212.

Accordingly, in the spoiler retracting procedure, the left rod actual measured distance R1A is converted into an angle and the resulting angle is treated as the angle of the left spoiler 112 if no irregularity is occurring in the left position detector 139. Similarly, if no irregularity is occurring in the right position detector 239, the right rod actual measured distance R1B is converted into an angle and the resulting angle is treated as the angle of the right spoiler 212. Since the angles obtained in this manner are used to make a determination as to the difference in angle, an accurate determination can be made.

If irregularity occurs in the left position detector 139, on the other hand, the results of the detection done by the left position detector 139 are not reliable. Accordingly, it is inappropriate to treat the left rod actual measured distance R1A as the angle of the left spoiler 112. The same applies to the right position detector 239. In the spoiler retracting procedure, if irregularity occurs in the left and right position detectors 139 and 239, the spoiler actual measured angles detected by the left and right actual measurement sensors 116 and 216 are corrected and the resulting angles are used as the angles of the spoilers. In this way, even if irregularity occurs in the left and right position detectors 139 and 239, a reasonably accurate determination can be made as to the difference in angle.

(3) In the spoiler retracting procedure, if irregular movement is detected in one of the spoilers and the other spoiler is positioned at the reference position (step S4: NO), the angle difference determining procedure is not performed and the simultaneous signal outputting procedure is performed, so that the actuator connection switches associated with both of the spoilers are placed in the disconnected state. In this case, the angle difference determining procedure is not performed. This can exempt the spoiler control device 60 from the load of the calculations for the angle difference determining procedure. Similarly, in the spoiler retracting procedure, if irregular movement is detected in a given one of the spoilers and the other of the spoilers forms a greater angle than the given spoiler (step S5: NO), the angle difference determining procedure is not performed and the simultaneous signal outputting procedure is performed. In this case, the same effects as above can be produced.

(4) As described in the above paragraph (3), in the spoiler retracting procedure, if irregular movement is detected in a given one of the spoilers and the other of the spoilers forms a greater angle than the given spoiler (step S5: NO), the simultaneous signal outputting procedure is performed. In this way, the use of both of the spoilers can be swiftly terminated.

The above embodiment can be modified as described below. The above embodiment and the following modifications can be implemented in combination to the extent where they are technically consistent with each other.

In relation to the irregularity detecting procedure, the details of the first condition required to be satisfied to detect irregular movement in the first irregularity mode are not limited to those described in relation to the above embodiment. The first condition can be freely set out as long as irregularity can be detected in the circuit of the comprehensive control device 50.

As in the above modification example, the details of the second condition required to be satisfied to detect irregular movement in the second irregularity mode are not limited to those described in relation to the above embodiment. The second condition can be freely set out as long as irregularity can be detected in the left and right position detectors 139 and 239.

As in the above modification example, the details of the third condition required to be satisfied to detect irregular movement in the third irregularity mode are not limited to those described in relation to the above embodiment. The third condition can be freely set out as long as irregularity can be detected in the left and right manipulation amount calculating units 62 and 72.

If irregular movement is detected in the left spoiler 112 and the right spoiler 212 is positioned at the reference position (step S4: NO), the right actuator connection switch 74 may not be placed in the disconnected state immediately by performing the step S7. Instead, the right actuator connection switch 74 may be placed in the disconnected state when the left spoiler 112 is back in the basic position. In other words, if the determination made in the step S4 indicates NO, the time difference signal outputting procedure may be performed.

Irrespective of whether irregularity occurs in the position detectors, the angle difference determining procedure may be performed using the left and right spoiler actual measured angles QA and QB.

The left retracting signal FA is not limited to the disconnection signal to be output to the left actuator connection switch 64. The left retracting signal FA can be configured in any manner as long as it is an instruction signal designed to move the left spoiler 112 back to the basic position. For example, the left retracting signal FA may be an instruction signal designed to calculate the left rod manipulation amount R3A such that the left rod 134 may be forced to move to put the left spoiler 112 back to the basic position. The same applies to the right retracting signal FB.

The left actuator 130 is not limited to the electrohydraulic actuator. The left actuator 130 may be, for example, an electromechanical actuator having a left rod to be driven by a motor. The same applies to the right actuator 230.

The irregularity detecting unit 82, the angle difference determining unit 84 and the signal outputting unit 86 may be provided in a control device, and the left manipulation amount calculating unit 62 and the right manipulation amount calculating unit 72 may be provided in a different control device. This may mean that the spoiler control device 60 may be formed only of the irregularity detecting unit 82, the angle difference determining unit 84 and the signal outputting unit 86. Alternatively, the spoiler control device 60 may include the functional units other than the left and right manipulation amount calculating units 62 and 72.

The reference position used to determine the position of the left rod 134 relative to the left cylinder 132 is not limited to the example mentioned in the above embodiment. The reference position may be the first-side end of the left cylinder 132 in the central axis direction, for example. The same applies to the reference position used to determine the position of the right rod 234 relative to the right cylinder 232.

The left actual measurement sensor 116 is not limited to a sensor configured to detect the rotational position of the rotation shaft. The left actual measurement sensor 116 may be any sensor as long as it is capable of detecting the angle of the left spoiler 112 relative to the left main wing 110. For example, the left actual measurement sensor 116 may be an image sensor that can image the position of the left spoiler 112 relative to the left main wing 110. The same applies to the right actual measurement sensor 216.

What is claimed is:

1. A spoiler control device applicable to an aircraft including left and right spoilers provided on left and right main wings, when driven by an actuator, each spoiler being movable between a basic position positioned on a same plane as a corresponding one of the main wings and a deployed position on a plane tilted relative to the corresponding main wing, the spoiler control device comprising:
    an irregularity detecting unit for detecting whether the left and right spoilers irregularly move toward the deployed position;
    an angle difference determining unit for obtaining angles formed by the left and right spoilers relative to the main wings and determining whether a difference between the obtained angles of the left and right spoilers is equal to or less than a specified value; and
    a signal outputting unit for outputting a retracting signal designed to move the left and right spoilers back to the basic position,
    wherein, based on the irregular movement being detected in a given one of the left and right spoilers, the signal outputting unit outputs the retracting signal for the given one of the spoilers and refrains from outputting the retracting signal for the other of the left and right spoilers, and if the difference between the angles of the left and right spoilers becomes equal to or less than the specified value, the signal outputting unit outputs the retracting signal for the other of the left and right spoilers.

2. The spoiler control device of claim 1, wherein the irregularity detecting unit determines whether the irregular movement of each of the spoilers is caused by irregularity in a position detector configured to detect a position of a rod connected to the spoiler and movable back and forth in a cylinder in the actuator, relative to the cylinder, and wherein if the irregular movement of the spoiler is not caused by irregularity in the position detector, the angle difference determining unit obtains, as the angle of the spoiler, the position of the rod and determines whether the difference between the angles of the left and right spoilers is equal to or less than the specified value, and wherein, if the irregular movement of the spoiler is caused by irregularity in the position detector, the angle difference determining unit obtains, as the angle of the spoiler, a value detected by an actual measurement sensor configured to detect an actual angle of the spoiler and determines whether the difference between the angles of the left and right spoilers is equal to or less than the specified value.

3. The spoiler control device of claim 1, wherein under an assumption that the angle of each of the spoilers takes a value of zero when the spoiler is at the basic position and takes a positive maximum value when the spoiler is at the deployed position, based on the irregular movement being detected in a given one of the left and right spoilers with the angles of the left and right spoilers both taking a value greater than zero, the signal outputting unit outputs the retracting signal for the given one of the left and right spoilers and refrains from outputting the retracting signal for the other of the left and right spoilers, and if the difference between the angles of the left and right spoilers becomes equal to or less than the specified value, the signal outputting unit outputs the retracting signal for the other of the left and right spoilers.

4. The spoiler control device of claim 1, wherein, based on the irregular movement being detected in a given one of the left and right spoilers with the angles of the left and right spoilers taking different values, the signal outputting unit outputs the retracting signal for the given one of the spoilers and refrains from outputting the retracting signal for the other of the left and right spoilers, and if the difference between the angles of the left and right spoilers becomes equal to or less than the specified value, the signal outputting unit outputs the retracting signal to the other of the left and right spoilers.

5. The spoiler control device of claim 1, wherein under an assumption that the angle of each of the spoilers takes a value of zero when the spoiler is at the basic position and takes a positive maximum value when the spoiler is at the deployed position, based on the irregular movement being detected in a given one of the left and right spoilers with the angle of the given one of the left and right spoilers taking a value greater than zero and the angle of the other of the left and right spoilers taking a value of zero, the signal outputting unit outputs the retracting signal simultaneously to the left and right spoilers.

6. A spoiler control device applicable to an aircraft including left and right spoilers provided on left and right main wings, when driven by an actuator, each spoiler being movable between a basic position positioned on a same plane as a corresponding one of the main wings and a deployed position on a plane tilted relative to the corresponding main wing, the spoiler control device comprising:

an irregularity detecting unit for detecting whether the left and right spoilers irregularly move toward the deployed position;

an angle difference determining unit for obtaining angles formed by the left and right spoilers relative to the main wings and determining whether a difference between the obtained angles of the left and right spoilers is equal to or less than a specified value; and a signal outputting unit for outputting a retracting signal designed to move the left and right spoilers back to the basic position, wherein, based on the irregular movement being detected in a given one of the left and right spoilers, the signal outputting unit outputs the retracting signal for the given one of the spoilers and refrains from outputting the retracting signal for the other of the left and right spoilers, and if the difference between the angles of the left and right spoilers becomes equal to or less than the specified value, the signal outputting unit outputs the retracting signal for the other of the left and right spoilers, wherein the irregularity detecting unit determines whether the irregular movement of each of the spoilers is caused by irregularity in a position detector configured to detect a position of a rod connected to the spoiler and movable back and forth in a cylinder in the actuator, relative to the cylinder, and wherein if the irregular movement of the spoiler is not caused by irregularity in the position detector, the angle difference determining unit obtains, as the angle of the spoiler, the position of the rod and determines whether the difference between the angles of the left and right spoilers is equal to or less than the specified value, and wherein, if the irregular movement of the spoiler is caused by irregularity in the position detector, the angle difference determining unit obtains, as the angle of the spoiler, a value detected by an actual measurement sensor configured to detect an actual angle of the spoiler and determines whether the difference between the angles of the left and right spoilers is equal to or less than the specified value.

7. A spoiler control method applicable to an aircraft including left and right spoilers provided on left and right main wings, when driven by an actuator, each spoiler being movable between a basic position positioned on a same plane as a corresponding one of the main wings and a deployed position on a plane tilted relative to the corresponding main wing, the spoiler control method comprising steps of:

detecting whether the left and right spoilers irregularly move toward the deployed position;

obtaining angles formed by the left and right spoilers relative to the main wings and determining whether a difference between the obtained angles of the left and right spoilers is equal to or less than a specified value; and outputting a retracting signal designed to move the left and right spoilers back to the basic position, wherein, based on the irregular movement being detected in a given one of the left and right spoilers, the signal outputting step outputs the retracting signal for the given one of the spoilers and refrains from outputting the retracting signal for the other of the left and right spoilers, and if the difference between the angles of the left and right spoilers becomes equal to or less than the specified value, the signal outputting step outputs the retracting signal for the other of the left and right spoilers.

8. A non-transitory computer-readable storage medium storing thereon a program for controlling a spoiler, the program being applicable to an aircraft including left and right spoilers provided on left and right main wings, when driven by an actuator, each spoiler being movable between a basic position positioned on a same plane as a corresponding one of the main wings and a deployed position on a plane tilted relative to the corresponding main wing, the program causing a computer to perform steps of:
  detecting whether the left and right spoilers irregularly move toward the deployed position;
  obtaining angles formed by the left and right spoilers relative to the main wings and determining whether a difference between the obtained angles of the left and right spoilers is equal to or less than a specified value; and
  outputting a retracting signal designed to move the left and right spoilers back to the basic position,
  wherein, based on the irregular movement being detected in a given one of the left and right spoilers, the signal outputting step outputs the retracting signal for the given one of the spoilers and refrains from outputting the retracting signal for the other of the left and right spoilers, and if the difference between the angles of the left and right spoilers becomes equal to or less than the specified value, the signal outputting step outputs the retracting signal for the other of the left and right spoilers.

* * * * *